United States Patent
Zhang

(10) Patent No.: US 11,032,833 B2
(45) Date of Patent: Jun. 8, 2021

(54) METHOD AND DEVICE FOR DYNAMIC SCHEDULING IN UE AND BASE STATION

(71) Applicant: SHANGHAI LANGBO COMMUNICATION TECHNOLOGY COMPANY LIMITED, Shanghai (CN)

(72) Inventor: XiaoBo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/546,290

(22) Filed: Aug. 20, 2019

(65) Prior Publication Data

US 2019/0380136 A1 Dec. 12, 2019

Related U.S. Application Data

(63) Continuation of application No. PCT/CN2017/074895, filed on Feb. 25, 2017.

(51) Int. Cl.
*H04W 72/12* (2009.01)
*H04W 72/04* (2009.01)
(Continued)

(52) U.S. Cl.
CPC ....... *H04W 72/1257* (2013.01); *H04L 1/0003* (2013.01); *H04L 1/1819* (2013.01);
(Continued)

(58) Field of Classification Search
CPC ......... H04W 72/1257; H04W 72/0446; H04W 72/0453; H04L 1/0003; H04L 1/1819; H04L 5/0082
(Continued)

(56) References Cited

U.S. PATENT DOCUMENTS

| 2007/0097915 | A1 | 5/2007 | Papasakellariou |
| 2012/0134306 | A1* | 5/2012 | Cheng ................. H04L 1/0067 370/281 |

(Continued)

FOREIGN PATENT DOCUMENTS

| CN | 101656602 A | 2/2010 |
| CN | 102300224 A | 12/2011 |

(Continued)

OTHER PUBLICATIONS

ISR received in application No. PCT/CN2017/074895 dated Nov. 24, 2017.

*Primary Examiner* — Phong La
(74) *Attorney, Agent, or Firm* — Maschoff Brennan

(57) ABSTRACT

The disclosure provides a method and a device for dynamic scheduling in a User Equipment (UE) and a base station. The UE detects a first signaling. The first signaling is a physical layer signaling. The first signaling includes a first bit block, and a number of bits in the first bit block is related to a transmission mode of the first signaling. The transmission mode of the first signaling is one of multiple candidate modes. For the first candidate mode, the first bit block is transmitted multiple times; and for the second candidate mode, the first bit block is transmitted once. The disclosure establishes a relationship between a payload size of the first signaling and a transmission mode of the first signaling, thus reducing the payload size of the first signaling, simplifying the complexity of blind decoding of control signalings, and improving transmission efficiency and spectrum efficiency of the system.

16 Claims, 10 Drawing Sheets

(51) Int. Cl.
*H04L 1/18* (2006.01)
*H04L 5/00* (2006.01)
*H04L 1/00* (2006.01)

(52) U.S. Cl.
CPC ....... *H04L 5/0082* (2013.01); *H04W 72/0446* (2013.01); *H04W 72/0453* (2013.01)

(58) Field of Classification Search
USPC .......................................................... 370/329
See application file for complete search history.

(56) References Cited

U.S. PATENT DOCUMENTS

| | | | | |
|---|---|---|---|---|
| 2015/0124771 A1* | 5/2015 | Ko | ........................ | H04L 5/0001 370/329 |
| 2016/0359663 A1* | 12/2016 | Song | .................... | H04W 72/1289 |
| 2018/0019842 A1* | 1/2018 | Fu | ......................... | H04L 1/1864 |
| 2018/0337763 A1* | 11/2018 | Shi | ........................ | H04L 1/1864 |
| 2018/0343100 A1* | 11/2018 | Zhang | .................... | H04L 5/0082 |
| 2020/0329471 A1* | 10/2020 | Zhang | ................ | H04W 72/0413 |
| 2020/0329493 A1* | 10/2020 | Yang | ...................... | H04W 72/14 |
| 2020/0329518 A1* | 10/2020 | Liu | ................... | H04W 28/0268 |

FOREIGN PATENT DOCUMENTS

| | | | |
|---|---|---|---|
| CN | 102378112 A | 3/2012 | |
| CN | 103997788 A | 8/2014 | |
| CN | 104601303 A | 5/2015 | |
| CN | 105323049 A | 2/2016 | |
| CN | 105682241 A | 6/2016 | |
| CN | 106160974 A | 11/2016 | |
| EP | 2490391 A2 | 8/2012 | |

\* cited by examiner

METHOD AND DEVICE FOR DYNAMIC SCHEDULING IN UE AND BASE STATION

CROSS-REFERENCE TO RELATED APPLICATION

This application is a continuation of International Application No. PCT/CN2017/074895, filed Feb. 25, 2017, the full disclosure of which is incorporated herein by reference.

BACKGROUND

Technical Field

The disclosure relates to transmission methods and devices in wireless communication systems, and in particular to a transmission method and device of control channels in wireless communication for dynamic scheduling.

Related Art

In existing Long Term Evolution (LTE) systems, for a downlink subframe, a User Equipment (UE) will search for corresponding Downlink Control Information (DCI) in the downlink subframe. A downlink grant generally schedules a Downlink Shared Channel (DL-SCH) of a current subframe, while an uplink grant generally schedules an Uplink Shared Channel (UL-SCH) of a subsequent subframe. Different DCI formats correspond to different payload sizes, and different payload sizes correspond to independent blind decodings. In order to reduce a number of times of blind decoding of a UE, some different DCI formats are added with padding bits to keep a same payload size, for example, current DCI Format 1A and DCI Format 0.

In future mobile communication systems, beamforming and massive Multiple Input Multiple Output (MIMO) systems will be introduced. Control signalings will be transmitted in sweeping and non-sweeping modes respectively. Correspondingly, payload sizes corresponding to DCI formats will be reviewed.

SUMMARY

One simple design approach of DCI format is to still use the approach in LTE that one DCI format corresponds to one payload size. However, when a control signaling is transmitted employing a sweeping mode, a data channel corresponding to the control signaling and a feedback channel will be more likely transmitted employing a sweeping mode. Correspondingly, when a control signaling is transmitted employing a non-sweeping mode, a data channel corresponding to the control signaling and a feedback channel will be more likely transmitted employing a non-sweeping mode. DCI payload sizes needed by the data channel and feedback channel employing a sweeping mode generally are smaller than DCI payload sizes needed by the data channel and feedback channel employing a non-sweeping mode. If the DCI format is still designed according to the above approach that one DCI format corresponds to one payload size, extra padding bits will be added, thereby resulting in waste of control signaling resources.

In view of the above problems, the disclosure provides a solution. It should be noted that the embodiments of the disclosure and the characteristics in the embodiments may be mutually combined arbitrarily if no conflict is incurred. For example, the embodiments of the UE of the disclosure and the characteristics in the embodiments may be applied to the base station, and vice versa.

The disclosure provides a method in a UE for wireless communication, wherein the method includes:

detecting a first signaling.

Herein, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once.

In one embodiment, the above method is characterized in that: a payload size of the first signaling is related to a transmission mode of the first signaling. When the first signaling employs different transmission modes, payload sizes corresponding to the first signaling are different.

In one embodiment, the above method has a following benefit that: a payload size of the first signaling is adjusted based on a transmission mode, without the need to introduce a padding bit to keep the restriction that one format corresponds to one payload size; thus, overheads of control signaling are reduced and efficiency of transmission is improved.

In one embodiment, the above method has another following benefit that: there is no need to design different DCI formats for all different payloads sizes, which reduces the complexity of the UE blind decoding the first signaling, thus reducing the implementation complexity of the UE.

In one embodiment, the first bit block is used as an input of channel coding, and the channel coding is based on polar codes.

In one subembodiment, the first bit block is a bit other than a frozen bit.

Specifically, according to one aspect of the disclosure, the above method includes:

Receiving a target radio signal.

Herein, the target radio signal is used for recovering the first signaling. The target radio sub-signal is formed by an output after a target bit block is processed in sequence through channel coding, modulation mapper, layer mapper, precoding, resource element mapper and generation of OFDM signals. The target bit block includes the first bit block.

In one embodiment, the multiple candidate modes include the first candidate mode and the second candidate mode only.

In one embodiment, the first signaling is a DCI.

In one embodiment, for the multiple candidate modes, a signaling format corresponding to the first signaling does not change.

In one subembodiment, the signaling format is a DCI Format.

In one embodiment, the first candidate mode corresponds to a transmission mode of sweeping, and the second candidate mode corresponds to a transmission mode of non-sweeping.

In one embodiment, the first candidate mode corresponds to a transmission mode of repetition, and the second candidate mode corresponds to a transmission mode of non-repetition.

In one embodiment, the first candidate mode corresponds to a non-beam-specific transmission mode, and the second candidate mode corresponds to a beam-specific transmission mode.

In one embodiment, the first bit block is composed of all bits in one field in the first signaling.

In one embodiment, the first bit block is composed of all information bits in the first signaling.

In one embodiment, the first bit block includes all information bits and all padded dummy bits in the first signaling.

In one embodiment, the first bit block includes all information bits and all padding bits in the first signaling.

In one embodiment, the first bit block is composed of all padded dummy bits in the first signaling; or the first bit block is composed of all padding bits in the first signaling.

In one embodiment, the transmission mode of the first signaling is the first candidate mode, and the first bit block is composed of P1 bit(s); the transmission mode of the first signaling is the second candidate mode, and the first bit block is composed of P2 bit(s). The P1 and the P2 are both positive integers, and the P1 is not equal to the P2.

In one subembodiment, the P1 is greater than the P2.

In one embodiment, a first search space is a search space for the first signaling based on the first candidate mode, and a second search space is a search space for the first signaling based on the second candidate mode.

In one subembodiment, no Resource Element (RE) belongs to both the first search space and the second search space.

In one subembodiment, the first search space and the second search space are orthogonal in time domain.

In one subembodiment, the first search space and the second search space are partially or fully overlapping in time domain.

In one subembodiment, the first search space and the second search space are partially or fully overlapping in frequency domain.

In one subembodiment, the first search space belongs to a first time-frequency resource pool, and the second search space belongs to a second time-frequency resource pool. The first time-frequency resource pool occupies a frequency bandwidth corresponding to a positive integer number of Physical Resource Block(s) (PRB(s)) in frequency domain, and occupies a positive integer number of multicarrier symbol(s) in time domain. The second time-frequency resource pool occupies a frequency bandwidth corresponding to a positive integer number of PRB(s) in frequency domain, and occupies a positive integer number of multicarrier symbol(s) in time domain.

In one embodiment, the multicarrier symbol in the disclosure is one of the following:

an Orthogonal Frequency Division Multiplexing (OFDM) symbol;

a Filtering Bank Multile Carrier (FBMC) symbol; and a Single Carrier Frequency Division Multiple Access (SC-FDMA) symbol.

Specifically, according to one aspect of the disclosure, the above method is characterized in that: the first bit block includes all information bits in the first signaling. For the first bit block, the second candidate mode lacks a first bit field compared with the first candidate mode. The first bit field includes a positive integer number of bit(s).

In one embodiment, the above method is characterized in that: whether the first bit field exists in the first signaling is related to a transmission mode of the first signaling.

In one embodiment, the above method has a following benefit: when the first signaling is transmitted employing the second candidate mode, a payload size of the first signaling is reduced, which reduces overheads of control signalings and improves efficiency of spectrum.

In one embodiment, the first bit field is used for determining at least one of time-domain resources occupied by a given radio signal, one or more downlink antenna ports, or one or more uplink antenna ports.

In one subembodiment, the first signaling is a downlink grant, and a transport channel corresponding to the given radio signal is a DL-SCH. The first bit field is used for determining at least one of time-domain resources occupied by the given radio signal, or one or more downlink antenna ports.

In one subembodiment, the first signaling is an uplink grant, and a transport channel corresponding to the given radio signal is a UL-SCH. The first bit field is used for determining at least one of time-domain resources occupied by the given radio signal, or one or more uplink antenna ports.

In one embodiment, the bit in the first bit field is an information bit.

In one embodiment, the bit in the first bit field is a padded dummy bit.

In one embodiment, the first signaling is a DCI, and the first bit field is one field in the first signaling.

Specifically, according to one aspect of the disclosure, the above method is characterized in that: for the first bit block, the second candidate mode and the first candidate mode share all bit fields other than the first bit field.

In one embodiment, the above method is characterized in that: only the first bit field in the first signaling is related to a transmission mode employed by the first signaling.

In one embodiment, any one of the all bit fields other than the first bit field includes a same number of bits for the second candidate mode and the first candidate mode.

In one embodiment, all bits in the all bit fields other than the first bit field are information bits.

Specifically, according to one aspect of the disclosure, the above method further includes the following steps:

operating a first radio signal.

Herein, the operating is receiving, or the operating is transmitting. The first radio signal includes K radio sub-signal(s), and the K is a positive integer. A second bit block is used for generating the radio sub-signal. The first signaling is used for determining at least one of occupied time-domain resources, occupied frequency-domain resources, an employed Modulation and Coding Status (MCS), a New Data Indicator (NDI), an employed Redundancy Version (RV) or a Hybrid Automatic Repeat request (HARD) process number corresponding to the first radio signal. The first bit block is used for determining the K; or the first bit field is used for determining the K.

In one embodiment, the above method is characterized in that: when the first signaling is used for scheduling the first radio signal, the first bit block is used for indicating a number of times of transmission of the first radio signal, or the first bit field is used for indicating a number of times of transmission of the first radio signal.

In one embodiment, any two of the K radio sub-signals occupy orthogonal (non-overlapping) time-domain resources.

In one embodiment, the radio sub-signal is formed by an output after the second bit block is processed in sequence through channel coding, modulation mapper, layer mapper, precoding, resource element mapper, and generation of OFDM signals.

In one embodiment, the first bit block is used for determining the K, and the first bit block is composed of partial information bits in the first signaling.

In one embodiment, the first bit block includes a given bit field, and the given bit field indicates the K.

In one embodiment, the first bit field is used for determining the K. For the second candidate mode, the K is 1.

In one embodiment, for the first candidate mode, the first signaling includes the first bit field, and the first bit filed is used for determining the K; for the second candidate mode, the first signaling does not include the first bit field, and the K is 1.

In one subembodiment, the above method is characterized in that: a control signaling is transmitted employing a sweeping mode, and a data channel scheduled by the control signaling is also transmitted employing a sweeping mode. A control signaling is transmitted employing a non-sweeping mode, and a data channel scheduled by the control signaling is also transmitted employing a non-sweeping mode.

In one embodiment, the K radio sub-signals are transmitted in K time windows respectively.

In one subembodiment, the time window occupies one multicarrier symbol in time domain, or the time window occupies multiple multicarrier symbols in time domain.

Specifically, according to one aspect of the disclosure, the above method further includes:

transmitting a second signaling.

Herein, the operating is receiving. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

In one embodiment, the above method is characterized in that: time-frequency resources occupied by a HARQ-ACK feedback corresponding to the first radio signal are determined through the first bit block or the first bit field. A number of bits in the first bit block used for indicating time-frequency resources occupied by the HARQ-ACK feedback is related to a transmission mode of the first signaling, or whether the first bit field exists is related to a transmission mode of the first signaling.

In one embodiment, the second time-frequency resource set includes M subband(s) in frequency domain and N time interval(s) in time domain. The second time-frequency resources occupy a target subband in frequency domain, and the target subband is one of the M subband(s). The second time-frequency resources occupy a positive integer number of consecutive time interval(s) among the N time interval(s) in time domain. The M and the N are both positive integers. The subband occupies a positive integer number of subcarrier(s) in frequency domain. The time interval occupies one multicarrier symbol in time domain, or multiple consecutive multicarrier symbols.

In one subembodiment, the phrase of being used for determining the second time-frequency resources from the second time-frequency resource set refers to: being used for determining the target subband from the M subband(s), and being used for determining the positive integer number of consecutive time interval(s) from the N time interval(s).

In one subembodiment, the first bit block is used for determining the second time-frequency resources from the second time-frequency resource set, and the first bit block is composed of partial information bits in the first signaling.

In one subembodiment, the first bit block includes a second bit field, and the second bit field is used for determining the second time-frequency resources from the second time-frequency resource set.

In one affiliated embodiment of the above subembodiment, a transmission mode of the first signaling is the first candidate mode, the second bit field includes (Q1+Q2) bits, the Q1 is equal to $\lceil \log_2 M \rceil$, and the Q2 is related to a value of the N. Herein, $\lceil X \rceil$ represents a minimum positive integer not less than X.

In an example of the affiliated embodiment, the Q2 is equal to $\lceil \log_2 M \rceil$.

In one subembodiment, a transmission mode of the first signaling is the first candidate mode, the first signaling includes the first bit field, and the M is equal to 1. The second time-frequency resources occupy a same subband as the second time-frequency resource set in frequency domain. The first bit filed is used for determining the positive integer number of consecutive time interval(s) from the N time interval(s).

In one affiliated embodiment of the above subembodiment, the first bit field includes $\lceil \log_2 N \rceil_{bits}$.

In one affiliated embodiment of the above subembodiment, a number of information bits included in the first bit field is related to the N.

In one embodiment, the second time-frequency resource set includes M subband(s) in frequency domain, the second time-frequency resources occupy a target subband in frequency domain, and the target subband is one of the M subband(s). The M is a positive integer. The subband occupies a positive integer number of subcarrier(s) in frequency domain.

In one subembodiment, the phrase of being used for determining the second time-frequency resources from the second time-frequency resource set refers to: being used for determining the target subband from the M subbands.

In one subembodiment, the first bit block is used for determining the second time-frequency resources from the second time-frequency resource set, and the first bit block is composed of partial information bits in the first signaling.

In one subembodiment, the first bit block includes a second bit field, and the second bit field is used for determining the second time-frequency resources from the second time-frequency resource set.

In one affiliated embodiment of the above subembodiment, a transmission mode of the first signaling is the second candidate mode, the second bit field includes Q1 bits, and the Q1 is equal to $\lceil \log_2 M \rceil$.

In one subembodiment, a transmission mode of the first signaling is the second candidate mode, the first signaling does not include the first bit field, and the M is equal to 1. The second time-frequency resources occupy a same subband as the second time-frequency resource set in frequency domain.

Specifically, according to one aspect of the disclosure, the above method further includes:

receiving first information.

Herein, the first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one embodiment, the first time-frequency resource pool is a search space for the first signaling based on the first candidate mode.

In one embodiment, the second time-frequency resource pool is a search space for the first signaling based on the second candidate mode.

In one embodiment, the first time-frequency resource pool includes a positive integer number of PRB(s) in frequency domain, and includes a positive integer number of multicarrier symbol(s) in time domain; and the second time-frequency resource pool includes a positive integer number of PRB(s) in frequency domain, and includes a positive integer number of multicarrier symbol(s) in time domain.

In one embodiment, the first signaling employs the first candidate mode, and the UE searches for the first signaling in the first time-frequency resource pool only; or the first signaling employs the second candidate mode, and the UE searches for the first signaling in the second time-frequency resource pool only.

In one embodiment, the UE searches for the first signaling in the first time-frequency resource group.

Specifically, according to one aspect of the disclosure, the above method is characterized in that: the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

In one embodiment, the given RE set is a first RE set in the Y RE set(s).

In one embodiment, the given RE set is an RE set corresponding to a minimum index of RE set among the Y RE set(s).

In one embodiment, a transmission mode of the first signaling is the first candidate mode, and code-domain resources occupied by the second signaling in the second time-frequency resources are determined by a position of the given RE set in the Y1 RE set(s).

In one embodiment, a transmission mode of the first signaling is the second candidate mode, and code-domain resources occupied by the second signaling in the second time-frequency resources are determined by a position of the given RE set in the Y2 RE set(s).

In one embodiment, code-domain resources occupied by the second signaling in the second time-frequency resources are determined by a position of the given RE set in the Y3 RE set(s).

In one embodiment, the second time-frequency resources are code division multiplexed by multiple UEs, and the multiple UEs occupy multiple different code-domain resources respectively.

In one embodiment, the RE set is one Control Channel Element (CCE); or the RE set is one New Radio-CCE (NR-CCE).

In one embodiment, the RE set is a minimum unit carrying the first signaling.

The disclosure provides a method in a base station for dynamic scheduling in wireless communication, wherein the method includes:

transmitting a first signaling.

Herein, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once.

Specifically, according to one aspect of the disclosure, the above method includes:

transmitting a target radio signal.

Herein, bits in the first signaling are used for generating the target radio signal. The target radio sub-signal is formed by an output after a target bit block is processed in sequence through channel coding, modulation mapper, layer mapper, precoding, resource element mapper and generation of OFDM signals. The target bit block includes the first bit block.

In one embodiment, the target bit block includes bits in the first signaling and a frozen bit.

Specifically, according to one aspect of the disclosure, the above method is characterized in that: the first bit block includes all information bits in the first signaling. For the first bit block, the second candidate mode lacks a first bit field compared with the first candidate mode. The first bit field includes a positive integer number of bit(s).

Specifically, according to one aspect of the disclosure, the above method is characterized in that: for the first bit block, the second candidate mode and the first candidate mode share all bit fields other than the first bit field.

Specifically, according to one aspect of the disclosure, the above method further includes:

executing a first radio signal.

Herein, the executing is transmitting, or the executing is receiving. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K.

In one embodiment, the first signaling is a downlink grant, and the executing is transmitting.

In one embodiment, the first signaling is an uplink grant, and the executing is receiving.

Specifically, according to one aspect of the disclosure, the above method further includes:

receiving a second signaling.

Herein, the executing is transmitting. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

Specifically, according to one aspect of the disclosure, the above method further includes:

transmitting first information.

Herein, the first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

Specifically, according to one aspect of the disclosure, the above method is characterized in that: the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

The disclosure provides a UE for dynamic scheduling in wireless communication, wherein the UE includes:

a first receiver, to detect a first signaling.

Herein, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once.

In one embodiment, the above UE for dynamic scheduling in wireless communication is characterized in that: the first receiver receives a target radio signal. Herein, the target radio signal is used for recovering the first signaling. The target radio sub-signal is formed by an output after a target bit block is processed in sequence through channel coding, modulation mapper, layer mapper, precoding, resource element mapper and generation of OFDM signals. The target bit block includes the first bit block.

In one embodiment, the above UE for dynamic scheduling in wireless communication is characterized in that: the first receiver receives first information. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one embodiment, the above UE for dynamic scheduling in wireless communication includes:

a first transceiver, to operate a first radio signal.

Herein, the to operate is to receive, or the to operate is to transmit. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K.

In one subembodiment, the above UE for dynamic scheduling in wireless communication includes:

a first transmitter, to transmit a second signaling.

Herein, the to operate is to receive. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

In one embodiment, the above UE for dynamic scheduling in wireless communication is characterized in that: the first bit block includes all information bits in the first signaling. For the first bit block, the second candidate mode lacks a first bit field compared with the first candidate mode. The first bit field includes a positive integer number of bit(s).

In one embodiment, the above UE for dynamic scheduling in wireless communication is characterized in that: for the first bit block, the second candidate mode and the first candidate mode share all bit fields other than the first bit field.

In one embodiment, the above UE for dynamic scheduling in wireless communication is characterized in that: the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

The disclosure provides a base station for dynamic scheduling in wireless communication, wherein the base station includes:

a second transmitter, to transmit a first signaling.

Herein, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once.

In one embodiment, the above base station for dynamic scheduling in wireless communication is characterized in that: the second transmitter transmits first information. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one embodiment, the above base station for dynamic scheduling in wireless communication is characterized in that: the second transmitter further transmits a target radio signal. Herein, bits in the first signaling are used for generating the target radio signal. The target radio sub-signal is formed by an output after a target bit block is processed in sequence through channel coding, modulation mapper, layer mapper, precoding, resource element mapper and generation of OFDM signals. The target bit block includes the first bit block.

In one embodiment, the above base station for dynamic scheduling in wireless communication includes:

a second transceiver, to execute a first radio signal.

Herein, the to execute is to transmit, or the to execute is to receive. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K.

In one subembodiment, the above base station for dynamic scheduling in wireless communication includes:
a second receiver, to receive a second signaling.

Herein, the to execute is to transmit. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

In one embodiment, the above base station for dynamic scheduling in wireless communication is characterized in that: the first bit block includes all information bits in the first signaling. For the first bit block, the second candidate mode lacks a first bit field compared with the first candidate mode. The first bit field includes a positive integer number of bit(s).

In one embodiment, the above base station for dynamic scheduling in wireless communication is characterized in that: for the first bit block, the second candidate mode and the first candidate mode share all bit fields other than the first bit field.

In one embodiment, the above base station for dynamic scheduling in wireless communication is characterized in that: the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

Compared with the prior art, the disclosure has the following technical advantages.

A payload size of the first signaling is adjusted based on a transmission mode, without the need to introduce a padding bit to keep the restriction that one format corresponds to one payload size; thus, overheads of control signaling are reduced and efficiency of transmission is improved.

There is no need to design different DCI formats for all different payloads sizes, which reduces the complexity of the UE blind decoding the first signaling, thus reducing the implementation complexity of the UE.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

The technical scheme of the disclosure is described below in further detail in conjunction with the drawings. It should be noted that the embodiments in the disclosure and the characteristics of the embodiments may be arbitrarily combined if no conflict is incurred.

Embodiment 1

Figure 1:
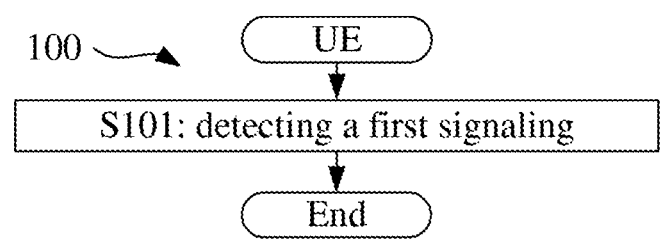
FIG. 1 is a flowchart of processing of a UE according to one embodiment of the disclosure.

Embodiment 1 illustrates an example of a flowchart of processing of a UE, as shown in FIG. 1. In 100 shown in FIG. 1, each box represents one step. In Embodiment 1, the UE in the disclosure detects a first signaling in S101.

In Embodiment 1, the first signaling is a physical layer signaling; the first signaling includes a first bit block, and a number of bits in the first bit block is related to a transmission mode of the first signaling; the transmission mode of the first signaling is one of multiple candidate modes; the multiple candidate modes include at least a first candidate mode and a second candidate mode; for the first candidate mode, the first bit block is transmitted multiple times; and for the second candidate mode, the first bit block is transmitted once.

Embodiment 2

Figure 2:
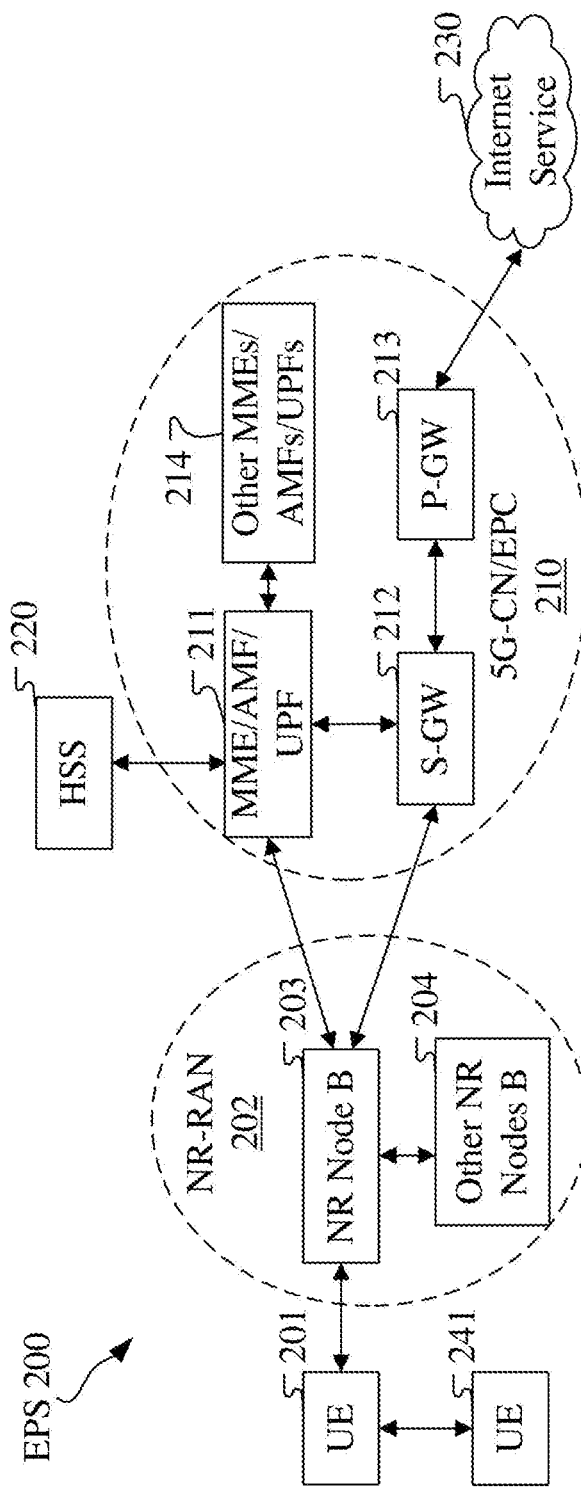
FIG. 2 is a diagram illustrating a network architecture according to one embodiment of the disclosure.

Embodiment 2 illustrates an example of a diagram of a network architecture, as shown in FIG. 2.

FIG. 2 is a diagram illustrating a network architecture 200 of NR 5G, LTE and Long-Term Evolution Advanced (LTE-A) systems. The NR 5G or LTE network architecture 200 may be called an Evolved Packet System (EPS) 200 or some other appropriate terms. The EPS 200 may include one or more UEs 201, a Next Generation-Radio Access Network (NG-RAN) 202, an Evolved Packet Core/5G-Core Network (EPC/5G-CN) 210, a Home Subscriber Server (HSS) 220 and an Internet service 230. The EPS may be interconnected with other access networks. For simple description, the entities/interfaces are not shown. As shown in FIG. 2, the EPS provides packet switching services. Those skilled in the art are easy to understand that various concepts presented throughout the disclosure can be extended to networks providing circuit switching services or other cellular networks. The NG-RAN includes an NR node B (gNB) 203 and other gNBs 204. The gNB 203 provides UE 201 oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Basic Service Set (BSS), an Extended Service Set (ESS), a TRP or some other appropriate terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistants (PDAs), satellite radios, non-territorial base station communications, satellite mobile communications, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art may also call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 includes a Mobility Management Entity/Authentication Management Field/User Plane Function (MME/AMF/UPF) 211, other MMEs/AMFs/UPFs 214, a Service Gateway (S-GW) 212 and a Packet Data Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including internet, intranet, IP Multimedia Subsystems (IP IMSs) and PS Streaming Services (PSSs).

In one embodiment, the UE 201 corresponds to the UE in the disclosure.

In one embodiment, the gNB 203 corresponds to the base station in the disclosure.

Embodiment 3

Figure 3:
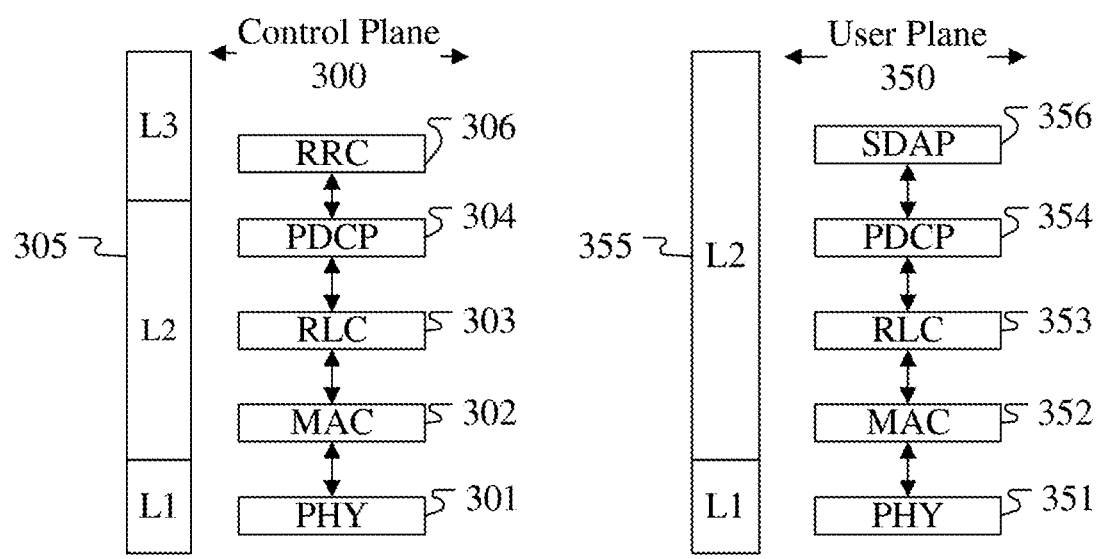
FIG. 3 is a diagram illustrating a radio protocol architecture of a user plane and a control plane according to one embodiment of the disclosure.

Embodiment 3 illustrates a diagram of an embodiment a radio protocol architecture of a user plane and a control plane according to the disclosure, as shown in FIG. 3. FIG. 3 is a diagram illustrating an embodiment of a radio protocol architecture of a user plane 350 and a control plane 300. In FIG. 3, the radio protocol architecture of a control plane 300 between a first communication node (UE, gNB or RSU in V2X) and a second communication node (gNB, UE or RSU in V2X) or between two UEs is illustrated by three layers, which are a Layer 1, a Layer 2 and a Layer 3 respectively. The Layer 1 (L1 layer) 301 is the lowest layer and implements various PHY (physical layer) signal processing functions. The L1 layer will be referred to herein as the PHY 301. The Layer 2 (L2 layer) 305 is above the PHY 301, and is responsible for the link between the first communication node and the second communication node and between two UEs over the PHY 301. The L2 layer 305 includes a Medium Access Control (MAC) sublayer 302, a Radio Link Control (RLC) sublayer 303, and a Packet Data Convergence Protocol (PDCP) sublayer 304, which are terminated at the second communication node. The PDCP sublayer 304 provides multiplexing between different radio bearers and logical channels. The PDCP sublayer 304 also provides security by encrypting packets and provides support for handover of the first communication node between the second communication nodes. The RLC sublayer 303 provides segmentation and reassembling of higher-layer packets, retransmission of lost packets, and reordering of lost packets to as to compensate for out-of-order reception due to HARQ. The MAC sublayer 302 provides multiplexing between logical channels and transport channels. The MAC sublayer 302 is also responsible for allocating various radio resources (i.e., resource blocks) in one cell among the first communication nodes. The MAC sublayer 302 is also in charge of HARQ operations. The RRC sublayer 306 in the Layer 3 (L3 layer) in the control plane 300 is responsible for acquiring radio resources (i.e. radio bearers) and configuring lower layers using an RRC signaling between the second communication node and the first communication node. The radio protocol architecture of the user plane 350 include a Layer 1 (L1 layer) and a Layer 2 (L2 layer); the radio protocol architecture for the first communication node and the second communication node in the user plane 350 on the PHY 301, the PDCP sublayer 354 in the L2 layer 305, the RLC sublayer 353 in the L2 layer 355 and the MAC sublayer 352 in the L2 layer 355 is substantially the same as the radio protocol architecture on corresponding layers and sublayers in the control plane 300, with the exception that the PDCP sublayer 354 also provides header compression for higher-layer packets so as to reduce radio transmission overheads. The L2 layer 355 in the user plane 350 further includes a Service Data Adaptation Protocol (SDAP) sublayer 356; the SDAP sublayer 356 is in charge of mappings between QoS flows and Data Radio Bearers (DRBs), so as to support diversification of services. Although not shown, the first communication node may include several higher layers above the L2 layer 355, including a network layer (i.e. IP layer) terminated at the P-GW on the network side and an application layer terminated at the other end (i.e. a peer UE, a server, etc.) of the connection.

In one embodiment, the radio protocol architecture shown in FIG. 3 is applicable to the UE in the disclosure.

In one embodiment, the radio protocol architecture shown in FIG. 3 is applicable to the base station in the disclosure.

Embodiment 4

Figure 4:
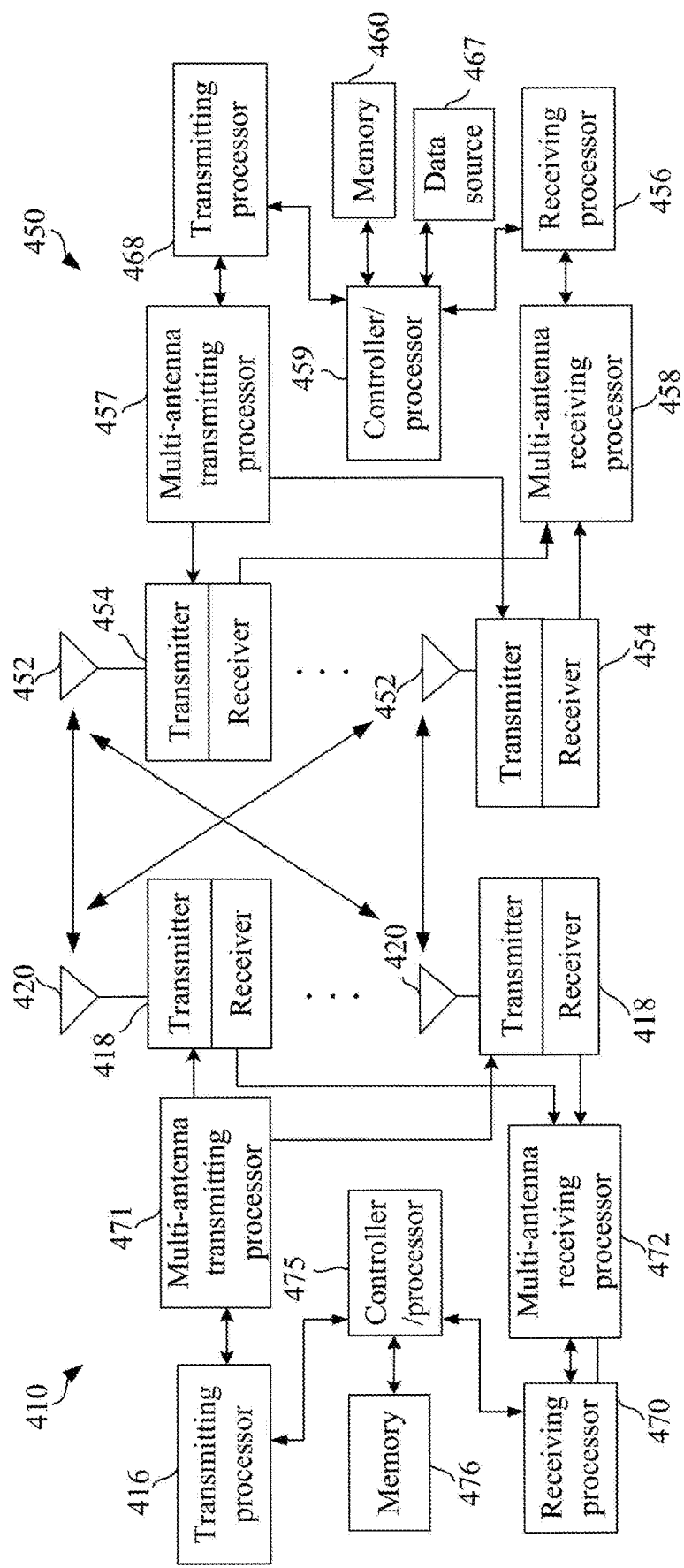
FIG. 4 is a diagram illustrating a base station and a UE according to one embodiment of the disclosure.

Embodiment 4 illustrates a diagram of a first communication equipment and a second communication equipment according to the disclosure, as shown in FIG. 4. FIG. 4 is a block diagram of a first communication equipment 450 and a second communication equipment 410 that are in communication with each other in an access network.

The first communication equipment 450 includes a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication equipment 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission from the second communication equipment 410 to the first communication equipment 450, at the second communication equipment 410, a higher-layer packet from a core network is provided to the controller/processor 475. The controller/processor 475 provides functions of Layer 2. In the transmission from the second communication equipment 410 to the first communication equipment 450, the controller/processor 475 provides header compression, encryption, packet segmentation and reordering, multiplexing between a logical channel and a transport channel, and a radio resource allocation for the first communication equipment 450 based on various priority metrics. The controller/processor 475 is also in charge of retransmission of lost packets, and signalings to the first communication equipment 450. The transmitting processor 416 and the multi-antenna transmitting processor 471 perform various signal processing functions used for Layer 1 (that is, PHY). The transmitting processor 416 performs encoding and interleaving so as to ensure FEC (Forward Error Correction) at the second communication equipment 410 and mappings to signal clusters corresponding to different modulation schemes (i.e., BPSK, QPSK, M-PSK M-QAM, etc.). The multi-antenna transmitting processor 471 processes the encoded and modulated symbols by digital spatial precoding (including precoding based on codebook and precoding based on non-codebook) and beamforming to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In a transmission from the second communication equipment 410 to the first communication equipment 450, at the first communication equipment 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform various signal processing functions of Layer 1. The multi-antenna receiving processor 458 processes the baseband multicarrier symbol stream coming from the receiver 454 by a receiving analog precoding/beamforming operation. The receiving processor 458 converts the baseband multicarrier symbol stream subjected to the receiving analog precoding/beamforming operation from time domain into frequency domain using FFT (Fast Fourier Transform). In frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the second communication equipment 410. Next, the higher-layer data and control signal are provided to the controller/processor 459. The controller/processor 459 performs functions of Layer 2. The controller/processor 459 may be connected to the memory 460 that stores program codes and data. The memory 460 may be called a computer readable media. In the transmission from the second communication equipment 410 to the first communication equipment 450, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above Layer 2, or various control signals can be provided to Layer 3 for processing.

In a transmission from the first communication equipment 450 to the second communication equipment 410, at the first communication equipment 450, the data source 467 provides a higher-layer packet to the controller/processor 459. The data source 467 illustrates all protocol layers above the L2 layer. Similar as the transmitting function of the second communication equipment 410 described in the transmission from the second communication equipment 410 to the first communication equipment 450, the controller/processor 459 provides header compression, encryption, packet segmentation and reordering, and multiplexing between a logical channel and a transport channel based on radio resource allocation so as to provide the functions of L2 layer used for the control plane and user plane. The controller/processor 459 is also in charge of retransmission of lost packets, and signalings to the second communication equipment 410. The transmitting processor 468 conducts modulation mapping and channel encoding processing; the multi-antenna transmitting processor 457 performs digital multi-antenna spatial precoding (including precoding based on codebook and precoding based on non-codebook) and beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In a transmission from the first communication equipment 450 to the second communication equipment 410, the function of the second communication equipment 410 is similar as the receiving function of the first communication equipment 450 described in the transmission from second communication equipment 410 to the first communication equipment 450. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of Layer 1. The controller/processor 475 provides functions of Layer 2. The controller/processor 475 may be connected to the memory 476 that stores program codes and data. The memory 476 may be called a computer readable media. In the transmission from the first communication equipment 450 to the second communication equipment 410, the controller/processor 475 provides de-multiplexing between the transport channel and the logical channel, packet reassembling, decryption, header decompression, and control signal processing so as to recover higher-layer packets coming from the UE 450. The higher-layer packet, coming from the controller/processor 475, may be provided to the core network.

In one embodiment, the first communication equipment 450 includes at least one processor and at least one memory. The at least one memory includes computer program codes. The at least one memory and the computer program codes are configured to be used in collaboration with the at least one processor. The first communication equipment 450 at least detects a first signaling; wherein the first signaling is a physical layer signaling; the first signaling includes a first bit block, and a number of bits in the first bit block is related to a transmission mode of the first signaling; the transmission mode of the first signaling is one of multiple candidate modes; the multiple candidate modes include at least a first candidate mode and a second candidate mode; for the first candidate mode, the first bit block is transmitted multiple times; and for the second candidate mode, the first bit block is transmitted once.

In one embodiment, the first communication equipment 450 includes a memory that stores a computer readable instruction program. The computer readable instruction program generates an action when executed by at least one processor. The action includes: detecting a first signaling; wherein the first signaling is a physical layer signaling; the first signaling includes a first bit block, and a number of bits in the first bit block is related to a transmission mode of the first signaling; the transmission mode of the first signaling is one of multiple candidate modes; the multiple candidate modes include at least a first candidate mode and a second candidate mode; for the first candidate mode, the first bit block is transmitted multiple times; and for the second candidate mode, the first bit block is transmitted once.

In one embodiment, the second communication equipment 410 includes at least one processor and at least one memory. The at least one memory includes computer program codes. The at least one memory and the computer program codes are configured to be used in collaboration with the at least one processor. The second communication equipment 410 at least transmits a first signaling; wherein the first signaling is a physical layer signaling; the first signaling includes a first bit block, and a number of bits in the first bit block is related to a transmission mode of the first signaling; the transmission mode of the first signaling is one of multiple candidate modes; the multiple candidate modes include at least a first candidate mode and a second candidate mode; for the first candidate mode, the first bit block is transmitted multiple times; and for the second candidate mode, the first bit block is transmitted once.

In one embodiment, the second communication equipment 410 includes a memory that stores a computer readable instruction program. The computer readable instruction program generates an action when executed by at least one processor. The action includes: transmitting a first signaling; wherein the first signaling is a physical layer signaling; the first signaling includes a first bit block, and a number of bits in the first bit block is related to a transmission mode of the first signaling; the transmission mode of the first signaling is one of multiple candidate modes; the multiple candidate modes include at least a first candidate mode and a second candidate mode; for the first candidate mode, the first bit block is transmitted multiple times; and for the second candidate mode, the first bit block is transmitted once.

In one embodiment, the first communication equipment 450 corresponds to the UE in the disclosure.

In one embodiment, the second communication equipment 410 corresponds to the base station in the disclosure.

In one embodiment, the first communication equipment 450 is one UE.

In one embodiment, the second communication equipment 410 is one base station.

In one embodiment, at least one of the antenna 452, the receiver 454, the multi-antenna receiving processor 458, the receiving processor 456 and the controller/processor 459 is used for detecting a first signaling; and at least one of the antenna 420, the transmitter 418, the multi-antenna transmitting processor 471, the transmitting processor 416 and the controller/processor 475 is used for transmitting a first signaling.

In one embodiment, at least one of the antenna 452, the receiver 454, the multi-antenna receiving processor 458, the receiving processor 456 and the controller/processor 459 is used for receiving a first radio signal; and at least one of the antenna 420, the transmitter 418, the multi-antenna transmitting processor 471, the transmitting processor 416 and the controller/processor 475 is used for transmitting a first radio signal.

In one embodiment, at least one of the antenna 452, the transmitter 454, the multi-antenna transmitting processor 457, the transmitting processor 468 and the controller/processor 459 is used for transmitting a first radio signal; and at least one of the antenna 420, the receiver 418, the multi-antenna receiving processor 472, the receiving processor 470 and the controller/processor 475 is used for receiving a first radio signal.

In one embodiment, at least one of the antenna 452, the transmitter 454, the multi-antenna transmitting processor 457, the transmitting processor 468 and the controller/processor 459 is used for transmitting a second signaling; and at least one of the antenna 420, the receiver 418, the multi-antenna receiving processor 472, the receiving processor 470 and the controller/processor 475 is used for receiving a second signaling.

In one embodiment, at least one of the antenna 452, the receiver 454, the multi-antenna receiving processor 458, the receiving processor 456 and the controller/processor 459 is used for receiving first information; and at least one of the antenna 420, the transmitter 418, the multi-antenna transmitting processor 471, the transmitting processor 416 and the controller/processor 475 is used for transmitting first information.

Embodiment 5

Figure 5:
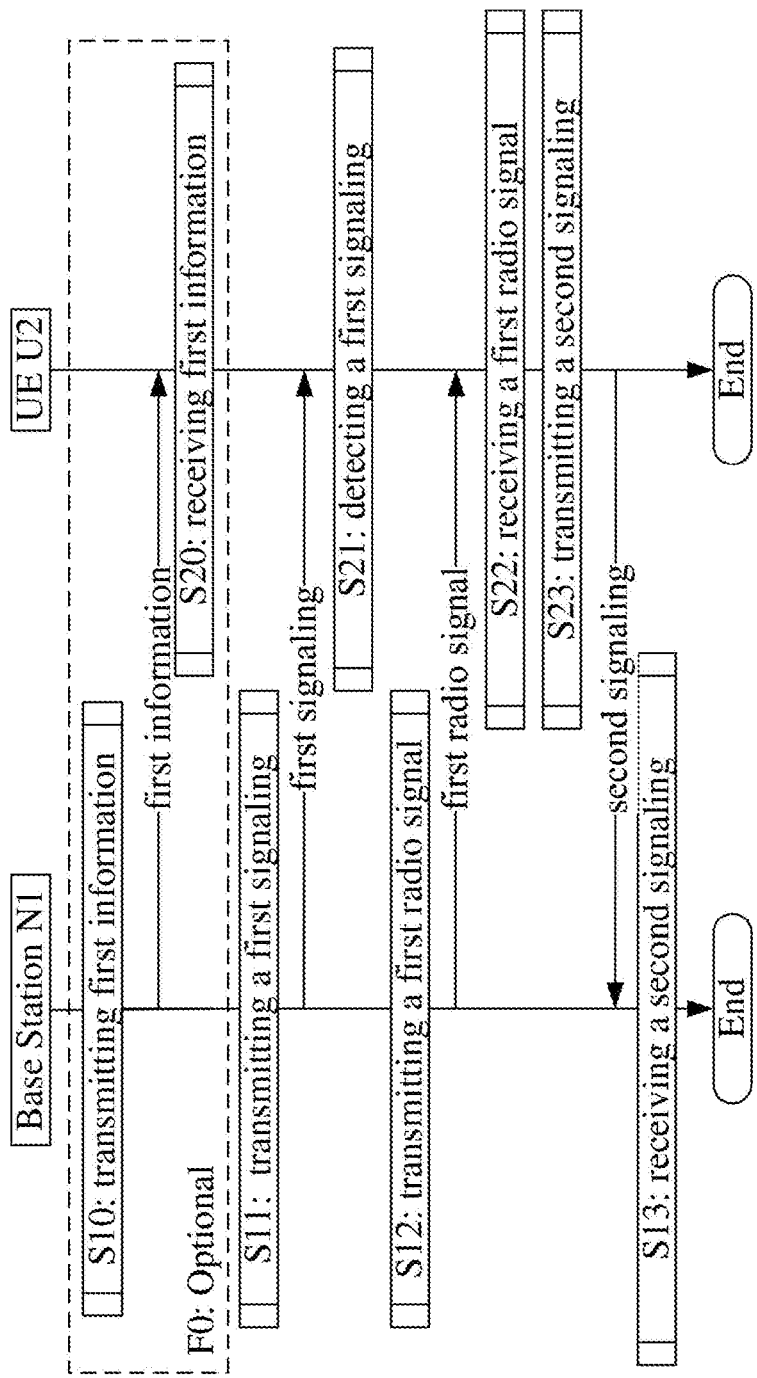
FIG. 5 is a flowchart of transmission of a first signaling according to one embodiment of the disclosure.

Embodiment 5 illustrates an example of a flowchart of transmission of a first signaling according to the disclosure, as shown in FIG. 5. In FIG. 5, a base station N1 is a maintenance base station for a serving cell of a UE U2. Steps in box F0 are optional.

The base station N1 transmits first information in S10, transmits a first signaling in S11, transmits a first radio signal in S12, and receives a second signaling in S13.

The UE U2 receives first information in S20, detects a first signaling in S21, receives a first radio signal in S22, and transmits a second signaling in S23.

In Embodiment 5, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once. The first bit block includes all information bits in the first signaling. For the first bit block, the second candidate mode lacks a first bit field compared with the first candidate mode. The first bit field includes a positive integer number of bit(s). For the first bit block, the second candidate mode and the first candidate mode share all bit fields other than the first bit field. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group. The first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

In one subembodiment, the first radio signal is transmitted on a physical layer data channel (a physical layer data capable of carrying physical layer data). The physical layer data channel is one of a Physical Downlink Shared Channel (PDSCH), a Short Latency-PDSCH (sPDSCH), a Narrow-Band-PDSCH (NB-PDSCH) or a NewRadio-PDSCH (NR-PDSCH).

In one subembodiment, a transport channel corresponding to the first radio signal is a DL-SCH.

In one subembodiment, the first information is a Radio Resource Control (RRC) layer signaling.

In one affiliated embodiment of the above subembodiment, the RRC layer signaling is cell specific.

In one affiliated embodiment of the above subembodiment, the RRC layer signaling is beam specific.

In one affiliated embodiment of the above subembodiment, the RRC layer signaling is beam group specific.

In one affiliated embodiment of the above subembodiment, the RRC layer signaling is UE specific.

In one subembodiment, the first information is transmitted through a broadcast signaling.

Embodiment 6

Figure 6:
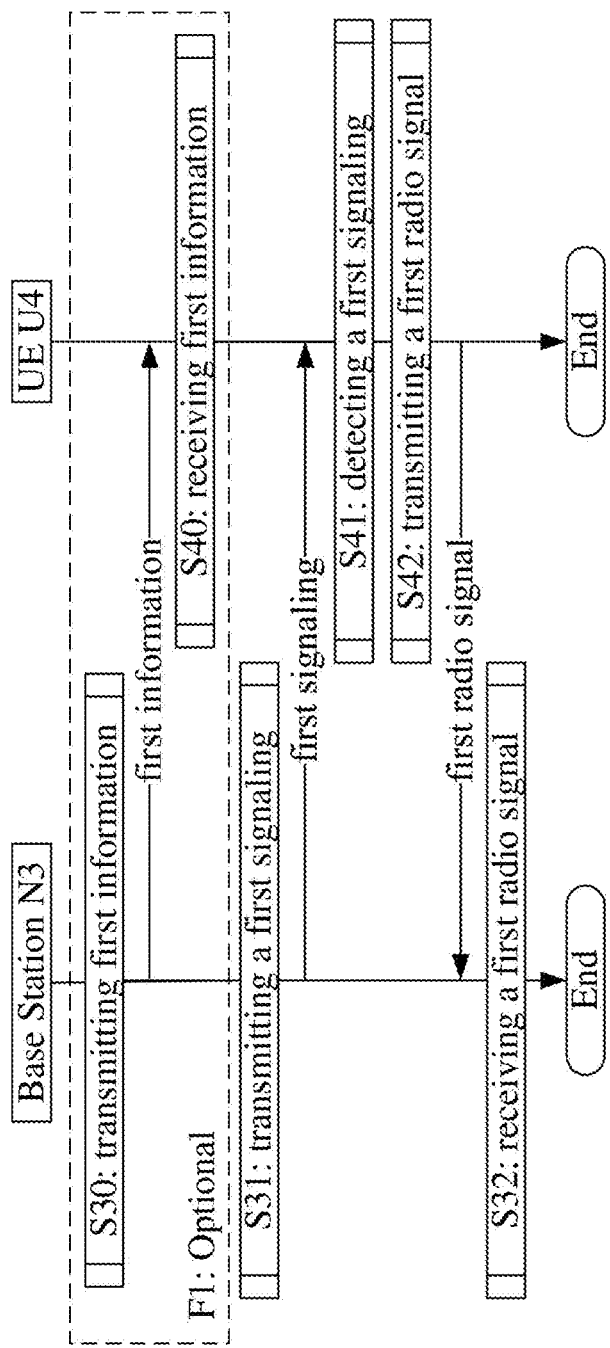
FIG. 6 is a flowchart of transmission of a first signaling according to another embodiment of the disclosure.

Embodiment 6 illustrates an example of another flowchart of transmission of a first signaling according to the disclosure, as shown in FIG. 6. In FIG. 6, a base station N3 is a maintenance base station for a serving cell of a UE U4. Steps in box F1 are optional.

The base station N3 transmits first information in S30, transmits a first signaling in S31 and receives a first radio signal in S32.

The UE U4 receives first information in S40, detects a first signaling in S41 and transmits a first radio signal in S42.

In Embodiment 6, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once. The first bit block includes all information bits in the first signaling. For the first bit block, the second candidate mode lacks a first bit field compared with the first candidate mode. The first bit field includes a positive integer number of bit(s). For the first bit block, the second candidate mode and the first candidate mode share all bit fields other than the first bit field. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one subembodiment, the first radio signal is transmitted on a physical layer data channel (a physical layer data capable of carrying physical layer data). The physical layer data channel is one of a Physical Uplink Shared Channel (PUSCH), a Short Latency-PUSCH (sPUSCH), a Narrow-Band-PUSCH (NB-PUSCH) or a NewRadio-PDSCH (NR-PUSCH).

In one subembodiment, a transport channel corresponding to the first radio signal is a UL-SCH.

In one subembodiment, the first information is an RRC layer signaling.

In one affiliated embodiment of the above subembodiment, the RRC layer signaling is cell specific.

In one affiliated embodiment of the above subembodiment, the RRC layer signaling is beam specific.

In one affiliated embodiment of the above subembodiment, the RRC layer signaling is beam group specific.

In one affiliated embodiment of the above subembodiment, the RRC layer signaling is UE specific.

In one subembodiment, the first information is transmitted through a broadcast signaling.

Embodiment 7

Figure 7:
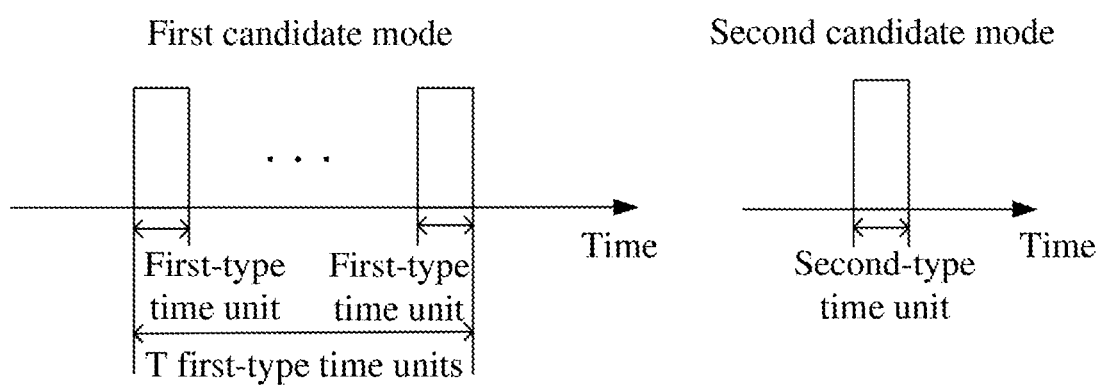
FIG. 7 is a diagram illustrating a transmission mode of a first bit block according to one embodiment of the disclosure.

Embodiment 7 illustrates an example of a diagram of a transmission mode of a first bit block. As shown in FIG. 7, a transmission mode of the first signaling in the disclosure is a first candidate mode, the first bit block is transmitted T times in T first-type time units, and the T is a positive integer greater than 1; a transmission mode of the first signaling in the disclosure is a second candidate mode, and the first bit block is transmitted once in a second-type time unit only. The first-type time unit occupies T1 multicarrier symbol(s) in time domain, and the second-type time unit occupies T2 multicarrier symbol(s) in time domain. The T1 and the T2 are both positive integers.

In one subembodiment, the T1 is equal to the T2.

In one subembodiment, the T1 is equal to 1.

In one subembodiment, the T first-type time units correspond to T beam directions respectively.

In one subembodiment, the T first-type time units correspond to T Quasi-Co-Location (QCL) indications respectively.

Embodiment 8

Figure 8:
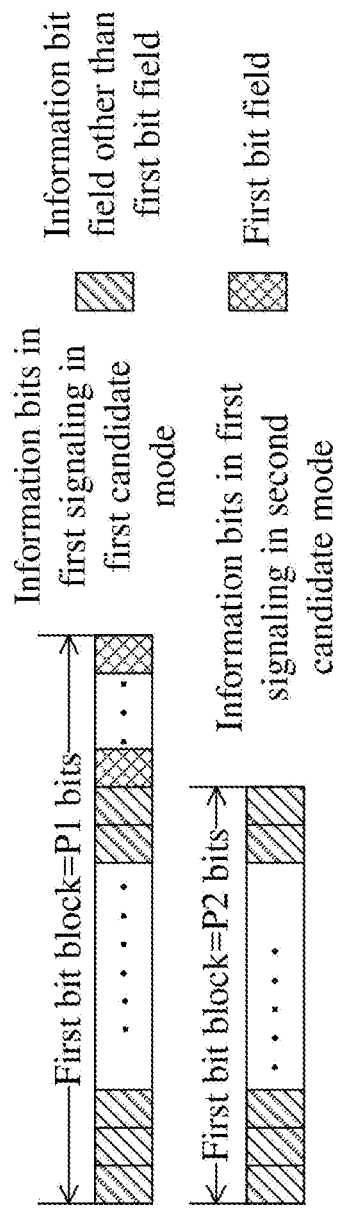
FIG. 8 is a diagram illustrating information bits in a first signaling according to one embodiment of the disclosure.

Embodiment 8 illustrates an example of a diagram of information bits in a first signaling according to the disclosure. As shown in FIG. 8, a transmission mode of the first signaling in the disclosure is a first candidate mode, and the first bit block includes P1 information bits; a transmission mode of the first signaling in the disclosure is a second candidate mode, and the first bit block includes P2 information bits. The P1 and the P2 are both positive integers greater than 1, and the P1 is greater than the P2.

In one subembodiment, the first signaling employs a given DCI formation in both the first candidate mode and the second candidate mode.

In one affiliated embodiment of the above subembodiment, the given DCI format includes a positive integer number of padding bits.

In one subembodiment, the first candidate mode corresponds to a transmission mode of sweeping, and the second candidate mode corresponds to a transmission mode of non-sweeping.

In one subembodiment, the first candidate mode corresponds to a transmission mode of repetition, and the second candidate mode corresponds to a transmission mode of non-repetition.

Embodiment 9

Figure 9:
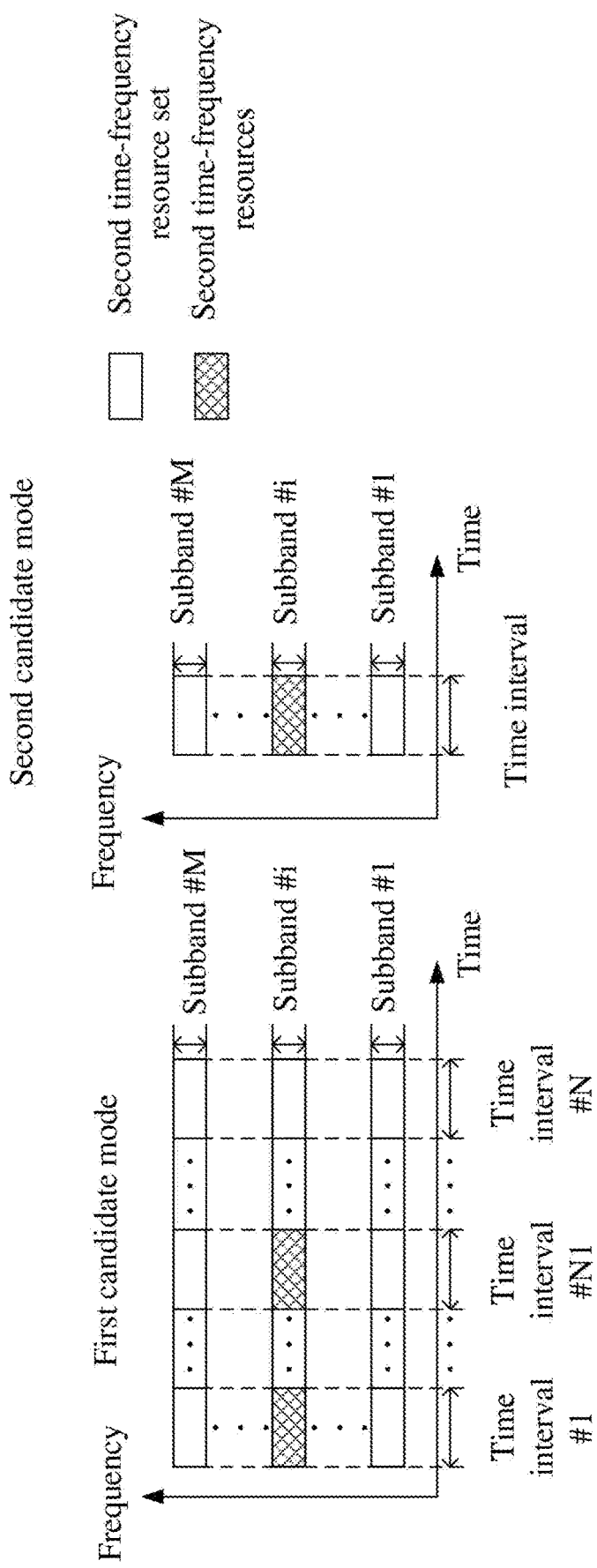
FIG. 9 is a diagram illustrating a second time-frequency resource set according to one embodiment of the disclosure.

Embodiment 9 illustrates an example of a diagram of a second time-frequency resource set according to the disclosure. As shown in FIG. 9. A transmission mode of the first signaling in the disclosure is a first candidate mode, the second time-frequency resource set includes M subbands in frequency domain, and the second time-frequency resource set includes N time intervals in time domain; a transmission mode of the first signaling in the disclosure is a second candidate mode, the second time-frequency resource set includes M subbands in frequency domain, and the second time-frequency resource set includes 1 time interval in time domain. The M is a positive integer, and the N is a positive integer greater than 1. The second time-frequency resources occupy one of the M subbands in frequency domain, such as a subband #i shown in FIG. 9, and the i is a positive integer greater than 1 but not greater than M. For the first candidate mode, the second time-frequency resources occupy N1 time intervals among the N time intervals in time domain, and the N1 is a positive integer greater than 1. For the second candidate mode, the second time-frequency resources occupy only 1 time interval in time domain.

In one subembodiment, the time interval occupies a duration of one multicarrier symbol.

In one subembodiment, the time interval occupies a duration of multiple multicarrier symbols.

In one subembodiment, the M subbands are consecutive in frequency domain.

In one subembodiment, the M subbands are discrete in frequency domain.

In one subembodiment, the second signaling is transmitted N1 times in N1 time intervals respectively.

In one subembodiment, the second signaling includes N1 sub-signalings, and the N1 sub-signalings are transmitted in N1 time intervals respectively.

In one subembodiment, a transmission mode of the first signaling is a first candidate mode. The first bit block is used for determining the subband #i and the N1 time intervals, or the first bit field is used for determining the subband #i and the N1 time intervals.

In one subembodiment, a transmission mode of the first signaling is a second candidate mode. The first bit block is used for determining the subband #i.

Embodiment 10

Figure 10:
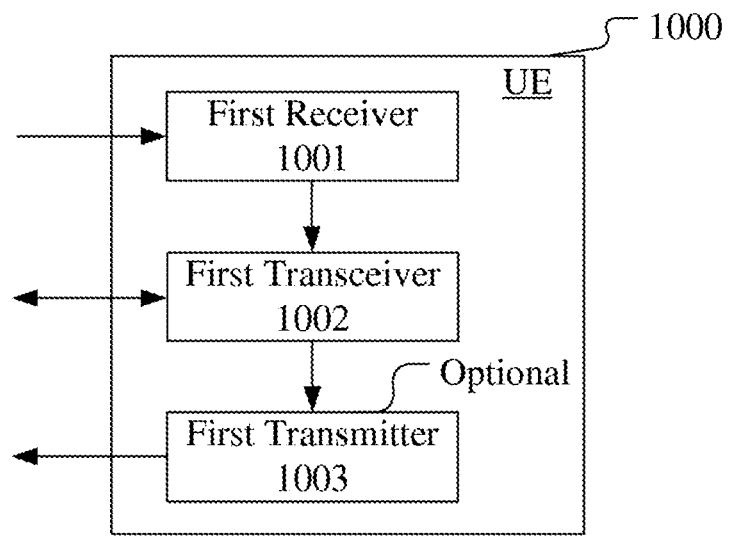
FIG. 10 is a structure block diagram illustrating a processing device in a UE according to one embodiment of the disclosure.

Embodiment 10 illustrates an example of a structure block diagram of a processing device in a UE, as shown in FIG. 10. In FIG. 10, the processing device 100 in the UE includes a first receiver 1001, a first transceiver 1002 and a first transmitter 1003. The first transmitter 1003 is optional.

The first receiver 1001 is configured to detect a first signaling.

The first transceiver 1002 is configured to operate a first radio signal.

The first transmitter 1003 is configured to transmit a second signaling.

In Embodiment 10, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once. The to operate is to receive, or the to operate is to transmit. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

In one subembodiment, the first receiver 1001 receives first information. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one subembodiment, the first bit block includes all information bits in the first signaling. For the first bit block, the second candidate mode lacks a first bit field compared with the first candidate mode. The first bit field includes a positive integer number of bit(s).

In one subembodiment, for the first bit block, the second candidate mode and the first candidate mode share all bit fields other than the first bit field.

In one subembodiment, the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

In one embodiment, the first receiver 1001 includes at least the former four of the antenna 452, the receiver 454, the multi-antenna receiving processor 458, the receiving processor 456 and the controller/processor 459 illustrated in Embodiment 4.

In one embodiment, the first transceiver 1002 includes at least the former six of the antenna 452, the transmitter/receiver 454, the multi-antenna transmitting processor 457, the multi-antenna receiving processor 458, the transmitting processor 468, the receiving processor 456 and the controller/processor 459 illustrated in Embodiment 4.

In one embodiment, the first transmitter 1003 includes at least the former four of the antenna 452, the transmitter 454, the multi-antenna transmitting processor 457, the transmitting processor 468 and the controller/processor 459 illustrated in Embodiment 4.

Embodiment 11

Figure 11:
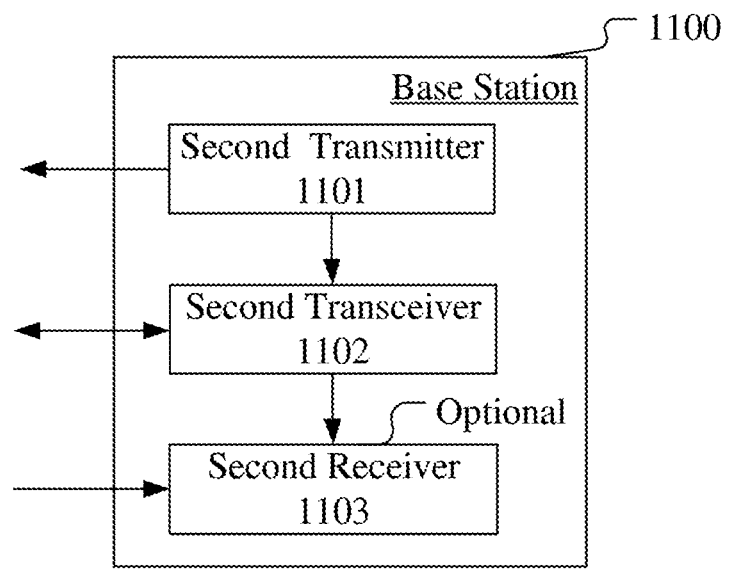
FIG. 11 is a structure block diagram illustrating a processing device in a base station according to one embodiment of the disclosure.

Embodiment 11 illustrates an example of a structure block diagram of a processing device in a base station, as shown in FIG. 11. In FIG. 11, the processing device 1100 in the base station includes a second transmitter 1101, a second transceiver 1102 and a second receiver 1103. The second receiver 1103 is optional.

The second transmitter 1101 is configured to transmit a first signaling.

The second transceiver 1102 is configured to execute a first radio signal.

The second receiver 1103 is configured to receive a second signaling.

In Embodiment 11, the first signaling is a physical layer signaling. The first signaling includes a first bit block, and a number of bits in the first bit block is related to a transmission mode of the first signaling. The transmission mode of the first signaling is one of multiple candidate modes. The multiple candidate modes include at least a first candidate mode and a second candidate mode. For the first candidate mode, the first bit block is transmitted multiple times; and for the second candidate mode, the first bit block is transmitted once. The to execute is to receive, or the to execute is to transmit. The first radio signal includes K radio sub-signal(s), and the K is a positive integer. A second bit block is used for generating the radio sub-signal. The first signaling is used for determining at least one of occupied time-domain resources, occupied frequency-domain resources, an employed MCS, an NDI, an employed RV or a HARQ process number corresponding to the first radio signal. The first bit block is used for determining the K; or the first bit field is used for determining the K. The second signaling is used for determining whether the first radio signal is correctly received. The second signaling is transmitted in second time-frequency resources, and the second time-frequency resources belong to a second time-frequency resource set. The first bit block is used for determining the second time-frequency resources from the second time-frequency resource set; or the first bit field is used for determining the second time-frequency resources from the second time-frequency resource set.

In one subembodiment, the second transmitter 1101 transmits first information. The first information is used for determining at least one of a first time-frequency resource pool or a second time-frequency resource pool. A first time-frequency resource group includes at least one of the first time-frequency resource pool or the second time-frequency resource pool. The detection of the first signaling is performed in the first time-frequency resource group.

In one subembodiment, the first bit block includes all information bits in the first signaling. For the first bit block, the second candidate mode lacks a first bit field compared with the first candidate mode. The first bit field includes a positive integer number of bit(s).

In one subembodiment, for the first bit block, the second candidate mode and the first candidate mode share all bit fields other than the first bit field.

In one subembodiment, the first signaling occupies Y RE set(s), the first time-frequency resource pool includes Y1 RE set(s), and the second time-frequency resource pool includes Y2 RE set(s). The Y1 RE set(s) and the Y2 RE set(s) constitute Y3 RE sets. A summation of the Y1 and the Y2 is equal to the Y3. Code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

In one embodiment, the second transmitter 1101 includes at least the former four of the antenna 420, the transmitter 418, the multi-antenna transmitting processor 471, the transmitting processor 416 and the controller/processor 475 illustrated in Embodiment 4.

In one embodiment, the second transceiver 1102 includes at least the former six of the antenna 420, the transmitter/receiver 418, the multi-antenna transmitting processor 471, the multi-antenna receiving processor 472, the receiving processor 470, the transmitting processor 416 and the controller/processor 475 illustrated in Embodiment 4.

In one embodiment, the second receiver 1103 includes at least the former four of the antenna 420, the receiver 418, the multi-antenna receiving processor 472, the receiving processor 470 and the controller/processor 475 illustrated in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE and terminal in the disclosure include but not limited to mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station in the disclosure includes but not limited to macro-cellular base stations, micro-cellular base stations, home base stations, relay base station, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for dynamic scheduling in wireless communication, comprising:
   receiving first information; and
   detecting a first signaling;
   wherein the first signaling is a physical layer signaling; the first signaling comprises a first bit block, and a number of bits in the first bit block is related to a transmission mode of the first signaling; the transmission mode of the first signaling is one of multiple candidate modes; the multiple candidate modes comprise at least a first candidate mode and a second candidate mode; for the first candidate mode, the first bit block is transmitted multiple times; and for the second candidate mode, the first bit block is transmitted once, the first information is used for determining at least one of a first time-frequency resource pool or a second time-frequency resource pool; a first time-frequency resource group comprises at least one of the first time-frequency resource pool or the second time-frequency resource pool; and the detection of the first signaling is performed in the first time-frequency resource group; the first signaling occupies Y Resource Element (RE) set(s), the first time-frequency resource pool comprises Y1 RE set(s), and the second time-frequency resource pool comprises Y2 RE set(s); the Y1 RE set(s) and the Y2 RE set(s) constitute Y3 RE sets; a summation of the Y1 and the Y2 is equal to the Y3; code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

2. The method according to claim 1, wherein the first bit block comprises all information bits in the first signaling; for the first bit block, the second candidate mode lacks a first bit field compared with the first candidate mode; and the first bit field comprises a positive integer number of bit(s).

3. The method according to claim 2, wherein for the first bit block, the second candidate mode and the first candidate mode share all bit fields other than the first bit field.

4. The method according to claim 1, comprising:
   operating a first radio signal;
   wherein the operating is receiving, or the operating is transmitting; the first radio signal includes K radio sub-signal(s), and the K is a positive integer; a second bit block is used for generating the radio sub-signal; the first signaling is used for determining at least one of occupied time-domain resources, occupied frequency-domain resources, an employed Modulation and Coding Status (MCS), a New Data Indicator (NDI), an employed Redundancy Version (RV) or a Hybrid Automatic Repeat request (HARQ) process number corresponding to the first radio signal; the first bit block is used for determining the K; or the first bit field is used for determining the K;

or comprising:
   receiving a first radio signal and transmitting a second signaling;
   wherein the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K; the second signaling is used for determining whether the first radio signal is correctly received; the second signaling is transmitted in second time-frequency resources, and the second time-frequency resources belong to a second time-frequency resource set; the first bit block is used for determining the second time-frequency resources from the second time-frequency resource set; or the first bit field is used for determining the second time-frequency resources from the second time-frequency resource set.

5. A method in a base station for dynamic scheduling in wireless communication, comprising:
   transmitting a first signaling;
   wherein the first signaling is a physical layer signaling; the first signaling comprises a first bit block, and a number of bits in the first bit block is related to a transmission mode of the first signaling; the transmission mode of the first signaling is one of multiple candidate modes; the multiple candidate modes comprise at least a first candidate mode and a second candidate mode; for the first candidate mode, the first bit block is transmitted multiple times; and for the second candidate mode, the first bit block is transmitted once; the first information is used for determining at least one of a first time-frequency resource pool or a second time-frequency resource pool; a first time-frequency resource group comprises at least one of the first time-frequency resource pool or the second time-frequency resource pool; and the detection of the first signaling is performed in the first time-frequency resource group; the first signaling occupies Y RE set(s), the first time-frequency resource pool comprises Y1 RE set(s), and the second time-frequency resource pool comprises Y2 RE set(s); the Y1 RE set(s) and the Y2 RE set(s) constitute Y3 RE sets; a summation of the Y1 and the Y2 is equal to the Y3; code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

6. The method according to claim 5, wherein the first bit block comprises all information bits in the first signaling; for the first bit block, the second candidate mode lacks a first bit field compared with the first candidate mode; and the first bit field comprises a positive integer number of bit(s).

7. The method according to claim 6, wherein for the first bit block, the second candidate mode and the first candidate mode share all bit fields other than the first bit field.

8. The method according to claim 5, comprising:
executing a first radio signal;
wherein the executing is transmitting, or the executing is receiving; the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K;

or, transmitting a first radio signal and receiving a second signaling;
wherein the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K; the second signaling is used for determining whether the first radio signal is correctly received; the second signaling is transmitted in second time-frequency resources, and the second time-frequency resources belong to a second time-frequency resource set; the first bit block is used for determining the second time-frequency resources from the second time-frequency resource set; or the first bit field is used for determining the second time-frequency resources from the second time-frequency resource set.

9. A UE for dynamic scheduling in wireless communication, comprising:
a first receiver, to receive first information and to detect a first signaling;
wherein the first signaling is a physical layer signaling; the first signaling comprises a first bit block, and a number of bits in the first bit block is related to a transmission mode of the first signaling; the transmission mode of the first signaling is one of multiple candidate modes; the multiple candidate modes comprise at least a first candidate mode and a second candidate mode; for the first candidate mode, the first bit block is transmitted multiple times; and for the second candidate mode, the first bit block is transmitted once; the first information is used for determining at least one of a first time-frequency resource pool or a second time-frequency resource pool; a first time-frequency resource group comprises at least one of the first time-frequency resource pool or the second time-frequency resource pool; and the detection of the first signaling is performed in the first time-frequency resource group; the first signaling occupies Y RE set(s), the first time-frequency resource pool comprises Y1 RE set(s), and the second time-frequency resource pool comprises Y2 RE set(s); the Y1 RE set(s) and the Y2 RE set(s) constitute Y3 RE sets; a summation of the Y1 and the Y2 is equal to the Y3; code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

10. The UE according to claim 9, wherein the first bit block comprises all information bits in the first signaling; for the first bit block, the second candidate mode lacks a first bit field compared with the first candidate mode; and the first bit field comprises a positive integer number of bit(s).

11. The UE according to claim 10, wherein for the first bit block, the second candidate mode and the first candidate mode share all bit fields other than the first bit field.

12. The UE according to claim 9, comprising:
a first transceiver, to operate a first radio signal;
wherein the to operate is to receive, or the to operate is to transmit; the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K;

or comprising:

a first transceiver, to receive a first radio signal; and a first transmitter, to transmit a second signaling;
wherein the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K; the second signaling is used for determining whether the first radio signal is correctly received; the second signaling is transmitted in second time-frequency resources, and the second time-frequency resources belong to a second time-frequency resource set; the first bit block is used for determining the second time-frequency resources from the second time-frequency resource set; or the first bit field is used for determining the second time-frequency resources from the second time-frequency resource set.

13. A base station for dynamic scheduling in wireless communication, comprising:
a second transmitter, to transmit first information and to transmit a first signaling;
wherein the first signaling is a physical layer signaling; the first signaling comprises a first bit block, and a number of bits in the first bit block is related to a transmission mode of the first signaling; the transmission mode of the first signaling is one of multiple candidate modes; the multiple candidate modes comprise at least a first candidate mode and a second candidate mode; for the first candidate mode, the first bit block is transmitted multiple times; and for the second candidate mode, the first bit block is transmitted once; the first information is used for determining at least one of a first time-frequency resource pool or a second time-frequency resource pool; a first time-frequency resource group comprises at least one of the first time-frequency resource pool or the second time-frequency resource pool; and the detection of the first signaling is performed in the first time-frequency resource group; the first signaling occupies Y RE set(s), the first time-frequency resource pool comprises Y1 RE set(s), and the second time-frequency resource pool comprises Y2 RE set(s); the Y1 RE set(s) and the Y2 RE set(s) constitute Y3 RE sets; a summation of the Y1 and the Y2 is equal to the Y3; code-domain resources occupied by the second signaling in the second time-frequency resources are determined by one of a position of a given RE set in the Y1 RE set(s), a position of a given RE set in the Y2 RE set(s) or a position of a given RE set in the Y3 RE sets.

14. The base station according to claim 13, wherein the first bit block comprises all information bits in the first signaling; for the first bit block, the second candidate mode lacks a first bit field compared with the first candidate mode; and the first bit field comprises a positive integer number of bit(s).

15. The base station according to claim 14, wherein for the first bit block, the second candidate mode and the first candidate mode share all bit fields other than the first bit field.

16. The base station according to claim 13, comprising:
a second transceiver, to execute a first radio signal;
wherein the to execute is to transmit, or the to execute is to receive; the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K;

or comprising:
a second transceiver, to transmit a first radio signal; and
a second receiver, to receive a second signaling;
wherein the first radio signal includes K radio sub-signal(s), and the K is a positive integer; a second bit block is used for generating the radio sub-signal; the first signaling is used for determining at least one of occupied time-domain resources, occupied frequency-domain resources, an employed MCS, an NDI, an employed RV or a HARQ process number corresponding to the first radio signal; the first bit block is used for determining the K; or the first bit field is used for determining the K; the second signaling is used for determining whether the first radio signal is correctly received; the second signaling is transmitted in second time-frequency resources, and the second time-frequency resources belong to a second time-frequency resource set; the first bit block is used for determining the second time-frequency resources from the second time-frequency resource set; or the first bit field is used for determining the second time-frequency resources from the second time-frequency resource set.

\* \* \* \* \*